United States Patent
Terris et al.

(10) Patent No.: US 6,447,069 B1
(45) Date of Patent: Sep. 10, 2002

(54) QUICK CONNECT/DISCONNECT APPARATUS FOR REMOVABLY SECURING ARMRESTS TO VEHICLE SEATING ASSEMBLIES

(75) Inventors: Edward R. Terris, East Lansing; Gasper J. Palazzolo, Williamston, both of MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/851,186

(22) Filed: May 8, 2001

(51) Int. Cl.[7] .............................. B60N 2/46; A47C 7/54
(52) U.S. Cl. ............................ 297/411.29; 297/411.32; 297/411.38
(58) Field of Search .................... 297/411.29, 411.3, 297/411.32, 411.35, 411.38, 440.1; 296/153

(56) References Cited

U.S. PATENT DOCUMENTS

| | | | |
|---|---|---|---|
| 1,022,632 A | 4/1912 | Leigh | |
| 3,807,779 A | 4/1974 | Enders | |
| 4,040,665 A | 8/1977 | Wallace et al. | |
| 4,118,069 A | * 10/1978 | Hunter | 297/411.29 |
| 4,527,832 A | 7/1985 | McMains et al. | |
| 4,902,072 A | 2/1990 | Chancellor, Jr. | |
| 5,316,373 A | 5/1994 | Markel | |
| 5,338,081 A | 8/1994 | Young et al. | |
| 5,597,209 A | 1/1997 | Bart et al. | |
| 5,902,005 A | 5/1999 | Lewczyk et al. | |
| 5,934,756 A | 8/1999 | Smith | |
| 6,050,645 A | * 4/2000 | Bradbury | 297/411.32 |
| 6,328,384 B1 | * 12/2001 | Yamauchi et al. | 297/411.29 |
| 6,375,265 B1 | * 4/2002 | Hubner et al. | 297/216.1 |

FOREIGN PATENT DOCUMENTS

JP 57-60931 A 4/1982

* cited by examiner

Primary Examiner—Anthony D. Barfield
(74) Attorney, Agent, or Firm—Myers Bigel Sibley & Sajovec

(57) ABSTRACT

An apparatus for removably securing an armrest to a mounting pin secured to a vehicle seat includes a housing, a user-actuated retaining member movably disposed within the housing, and a pair of diverging surfaces disposed within the housing. The retaining member includes a base portion and a pair of spaced-apart, resilient arms which extend outwardly from the base portion. Each arm includes an intermediate portion and a free end. The intermediate portion of each arm is configured to engage a respective portion of a groove that extends circumferentially around at least a portion of the mounting pin when the retaining member is in a relaxed configuration. An actuator is slidably disposed within the housing and is movable so as to engage, and apply a force to, the retaining member base portion. When the actuator applies a force to the retaining member base portion, the free end of each retaining member arm is caused to slide along respective diverging surfaces to urge the intermediate portions of the retaining member arms away from each other so that they become disengaged from the mounting pin groove.

15 Claims, 5 Drawing Sheets

QUICK CONNECT/DISCONNECT APPARATUS FOR REMOVABLY SECURING ARMRESTS TO VEHICLE SEATING ASSEMBLIES

FIELD OF THE INVENTION

The present invention relates generally to vehicle seats and, more particularly, to armrests for vehicle seats.

BACKGROUND OF THE INVENTION

Passenger seats in vehicles often include armrests for the comfort of vehicle occupants. Typically, armrests are attached to a side portion of a vehicle seat back and may be configured to pivot between a raised position and a lowered position. In a raised position, an armrest typically is aligned vertically with the seat back; in a lowered position, an armrest typically extends horizontally outwardly from the seat back and may provide support for the arm of an occupant.

Armrests configured for pivotal movement can be attached to seats in various known ways. One known attachment method utilizes a bolt that is inserted through a bore in the armrest and is threadingly engaged with a seat frame. For example, see U.S. Pat. No. 4,902,072 to Chancellor, Jr. Other known attachment methods may utilize numerous parts for movably attaching armrests to seat frames. For example, see U.S. Pat. No. 5,597,209 to Bart et al. Unfortunately, conventional attachment methods may make attachment and/or removal of an armrest a difficult and time consuming process. Moreover, conventional attachment devices may require numerous parts which may lead to increased costs.

SUMMARY OF THE INVENTION

In view of the above discussion, a quick connect/disconnect apparatus for removably securing armrests to vehicle seats is provided. According to an embodiment of the present invention, the quick connect/disconnect apparatus includes a housing configured to be attached to an armrest frame. The housing is configured to receive a free end of a mounting pin protruding from the side portion of a seat (e.g., the side portion of a vehicle seat back). A retaining member is movably disposed within the housing and includes a base portion and a pair of spaced-apart, resilient arms which extend outwardly from the base portion. Each arm includes an intermediate portion and a free end. The intermediate portion of each arm is configured to engage a respective portion of a groove that extends circumferentially around at least a portion of the mounting pin when the retaining member is in a relaxed configuration.

A pair of spaced-apart, diverging surfaces are disposed within the housing. An actuator (e.g., a button) is slidably disposed within the housing and is movable so as to engage, and apply a force to, the retaining member base portion when depressed by a user. When the actuator applies a force to the retaining member base portion, the free end of each retaining member arm is caused to slide along a respective one of the diverging surfaces. This movement causes the intermediate portions of the retaining member arms to move away from each other so that they become disengaged from a circumferentially-extending groove in the mounting pin and such that the housing and armrest can be removed from the mounting pin.

Quick connect/disconnect apparatus according to embodiments of the present invention may offer several advantages over conventional devices for attaching armrests to vehicle seats. Installation and removal of armrests incorporating an apparatus according to the present invention can be performed quickly and easily, and without tools. Moreover, time and costs associated with initial installation of armrests may be reduced.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1A:
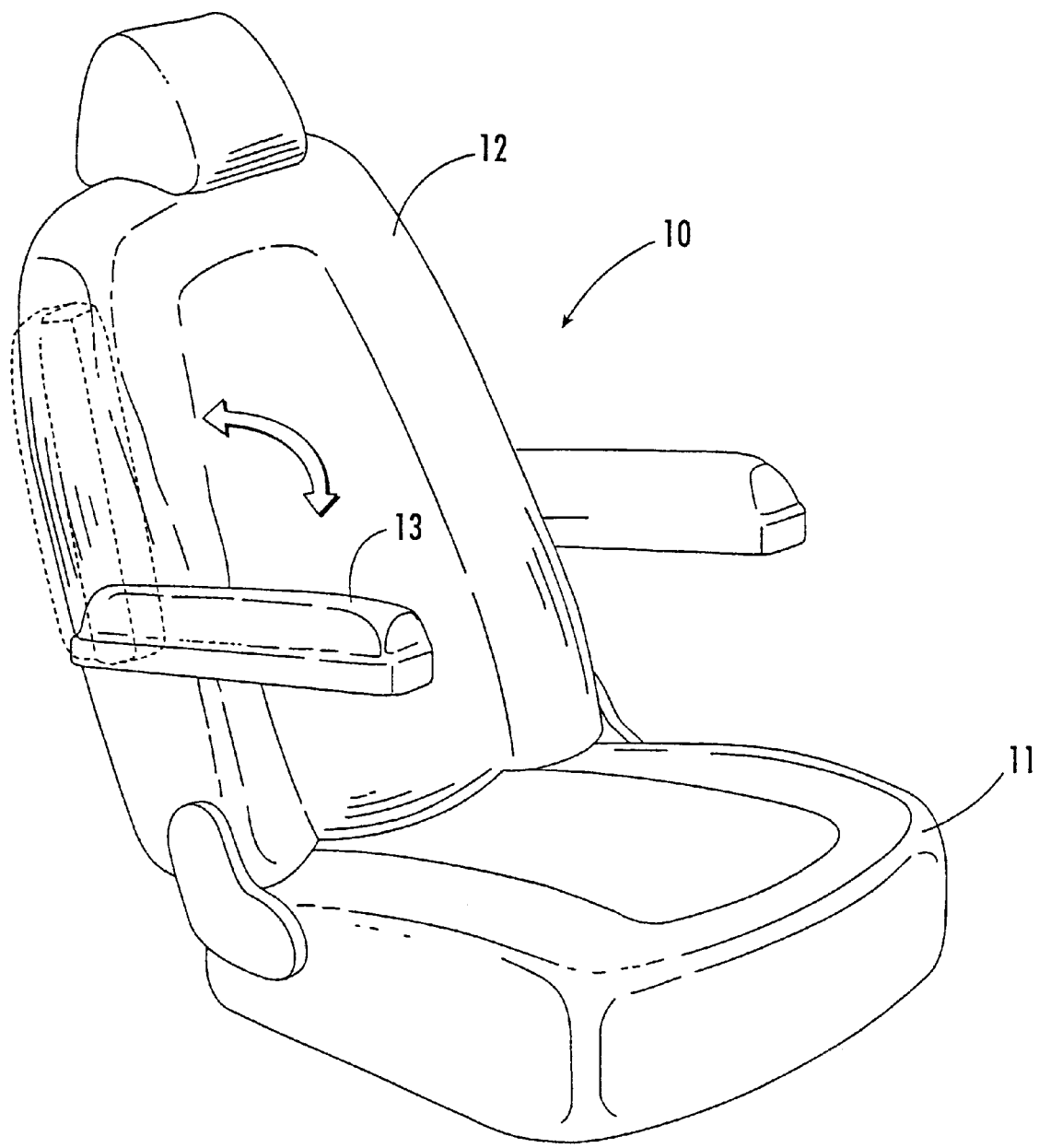
FIG. 1A is a perspective view of a vehicle seat assembly having an armrest attached thereto via a quick connect/disconnect apparatus according to embodiments of the present invention.

Referring initially to FIG. 1A, a seat assembly of the type suitable for vehicle use and within which an apparatus according to embodiments of the present invention may be utilized is indicated as 10. The illustrated seat assembly 10 may be installed in a vehicle (not shown) in a conventional manner and includes a seat bottom 11 and a seat back 12. An armrest 13 is pivotally attached to the seat back 12 and is configured to pivot with respect to the seat back 12 between a raised position and an lowered position. In the raised position, the armrest 13 is pivoted so that it is substantially vertically aligned with the seat back 12. In the operable position, the armrest 13 extends generally outwardly from the seat back 12 so that an occupant can rest his/her arm thereon.

Figure 1B:
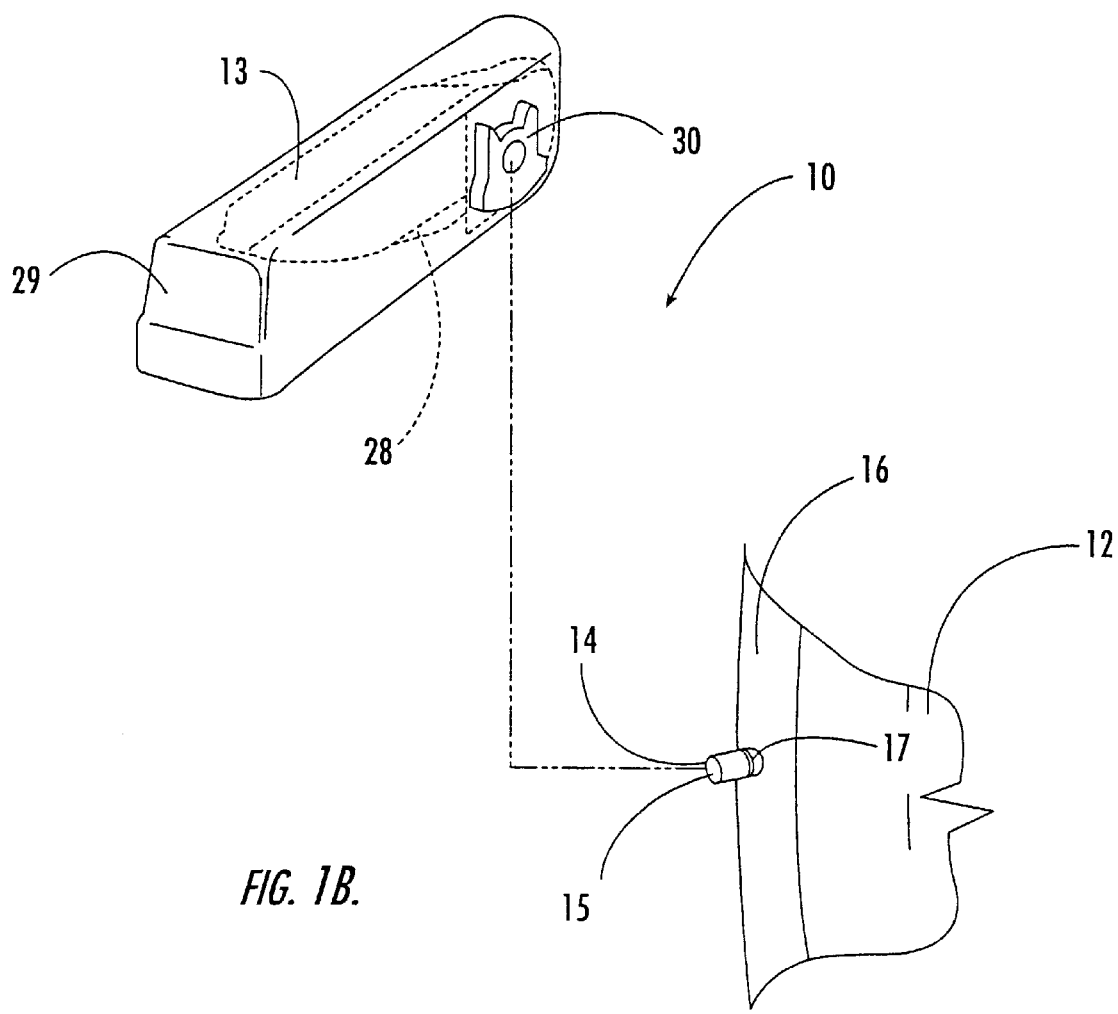
FIG. 1B is an exploded, partial perspective of the vehicle seat assembly of FIG. 1A.

As illustrated in FIG. 1B, the armrest 13 is configured to be pivotally attached, via a quick connect/disconnect apparatus 30, to a mounting pin 14 which extends outwardly from one side 16 of the seat back 12. The illustrated mounting pin 14 has a generally cylindrical configuration with a free end 15 and a circumferentially-extending groove 17 adjacent the free end 15. The free end 15 of the illustrated mounting pin 14 has a tapered (or "lead-in") configuration.

The illustrated armrest 13 includes a substantially rigid frame 28 which is covered with upholstery 29. The illustrated quick connect/disconnect apparatus 30 is attached to the frame 28. It is understood that a quick connect/disconnect apparatus 30 according to embodiments of the present invention may be utilized with various types and configurations of armrests, and is not limited to use with the illustrated armrest.

Figure 2A:
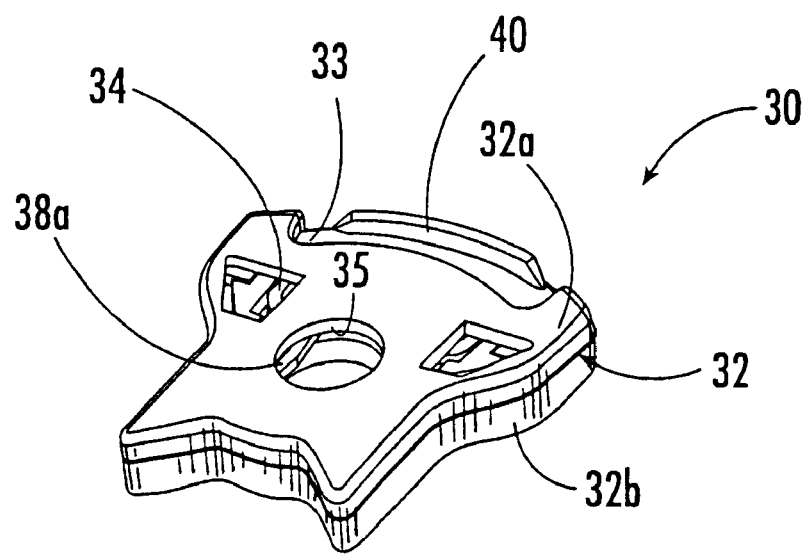
FIG. 2A is perspective view of a quick connect/disconnect apparatus for removably securing an armrest to a mounting pin protruding from a vehicle seat, according to an embodiment of the present invention.
Figure 2B:
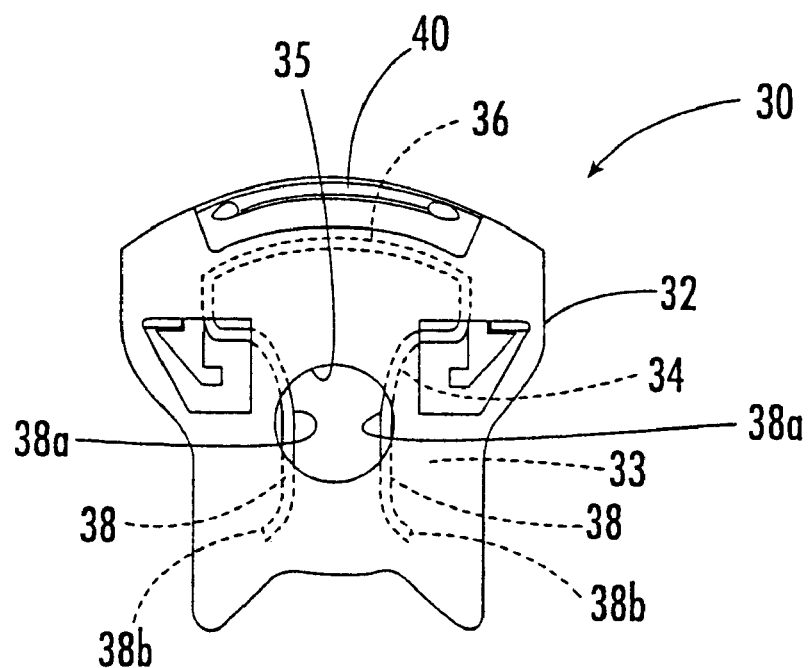
FIG. 2B is plan view of the apparatus of FIG. 2A illustrating a retaining member (in phantom line) movably disposed within the housing.

Referring now to FIGS. 2A–2B, the quick connect/disconnect apparatus 30 of FIG. 1B is illustrated in greater detail. The illustrated apparatus 30 includes a housing 32 having a top portion 32a and a bottom portion 32b connected thereto to form a cavity 33 therein. The housing 32 includes a bore 35 extending therethrough, as illustrated. The bore 35 is configured to receive the free end of a mounting pin protruding from a vehicle seat.

A retaining member 34 is movably disposed within the cavity 33 (FIG. 2B). The retaining member 34 includes a base portion 36 and a pair of spaced-apart, resilient arms 38 which extend outwardly from the base portion 36 on respective, opposite sides of the housing bore 35, as illustrated in FIG. 2B. The retaining member 34 is preferably made from flat, spring steel. However, materials of various types and shapes can be used.

Each arm 38 includes an intermediate portion 38a and a free end 38b. The intermediate portion 38a of each arm 38 is configured to engage a respective portion of a circumferentially-extending groove (17, FIG. 1B) in a mounting pin extending through the housing bore 35 when the retaining member 34 is in a relaxed configuration. In the illustrated embodiment, the intermediate portion 38a of each retaining member arm 38 is configured to engage a respective diametrically opposite portion of a circumferentially-extending groove 17 in a mounting pin. However, the present invention is not limited to the illustrated embodiment. The intermediate portion 38a of each retaining member arm 38 may have various configurations.

In the illustrated embodiment, the free ends 38b of the retaining member arms 38 have a diverging configuration. The diverging configuration facilitates engagement with the diverging surfaces of a diversion member, as will be described below. However, the free end 38b of each retaining member arm 38 may have various configurations.

Figure 3A:
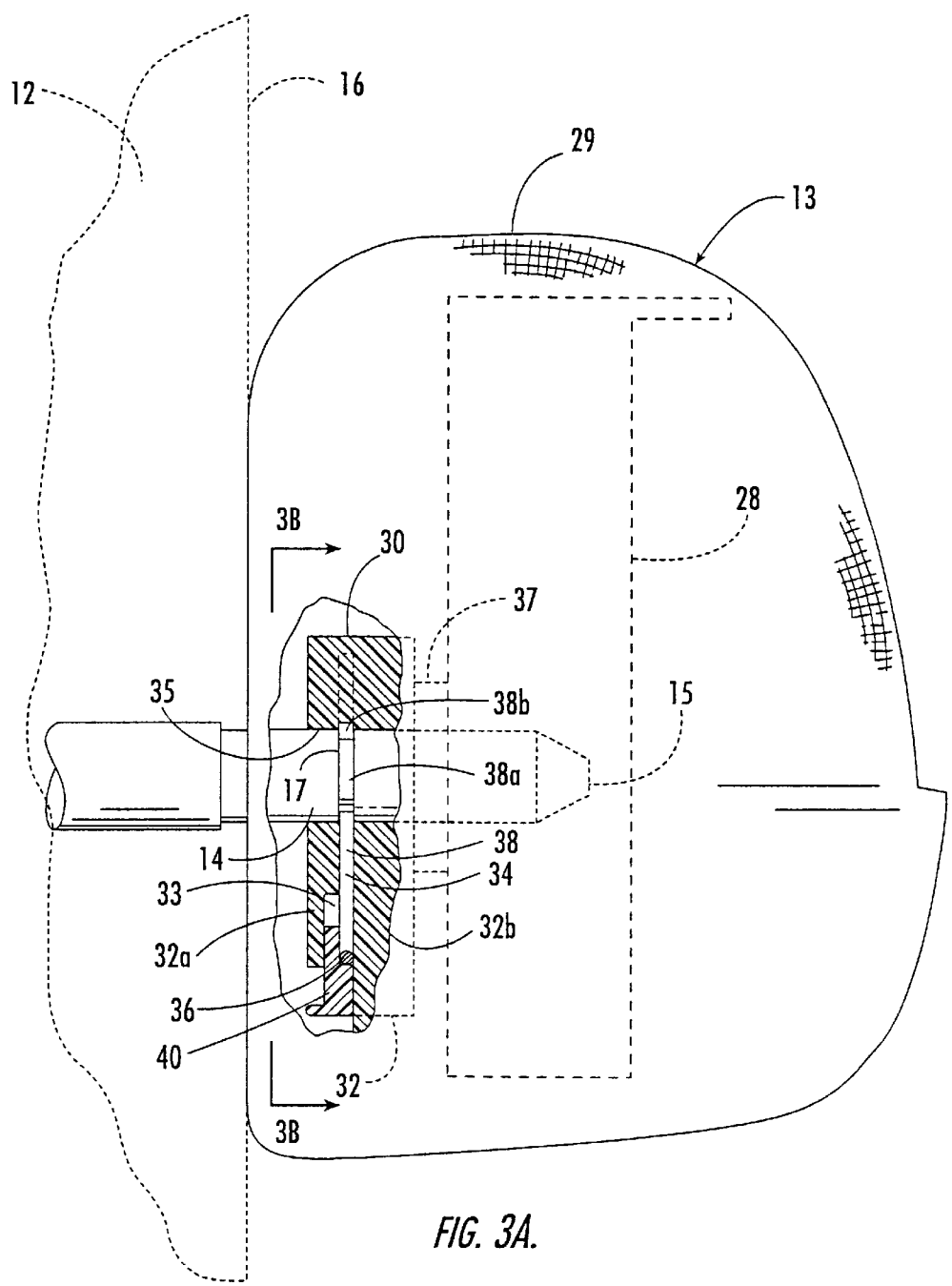
FIG. 3A is side elevation view of the quick connect/disconnect apparatus of FIGS. 2A–2C in an installed configuration, wherein the apparatus is attached to an armrest and wherein the armrest is removably secured to a vehicle seat.
Figure 3B:
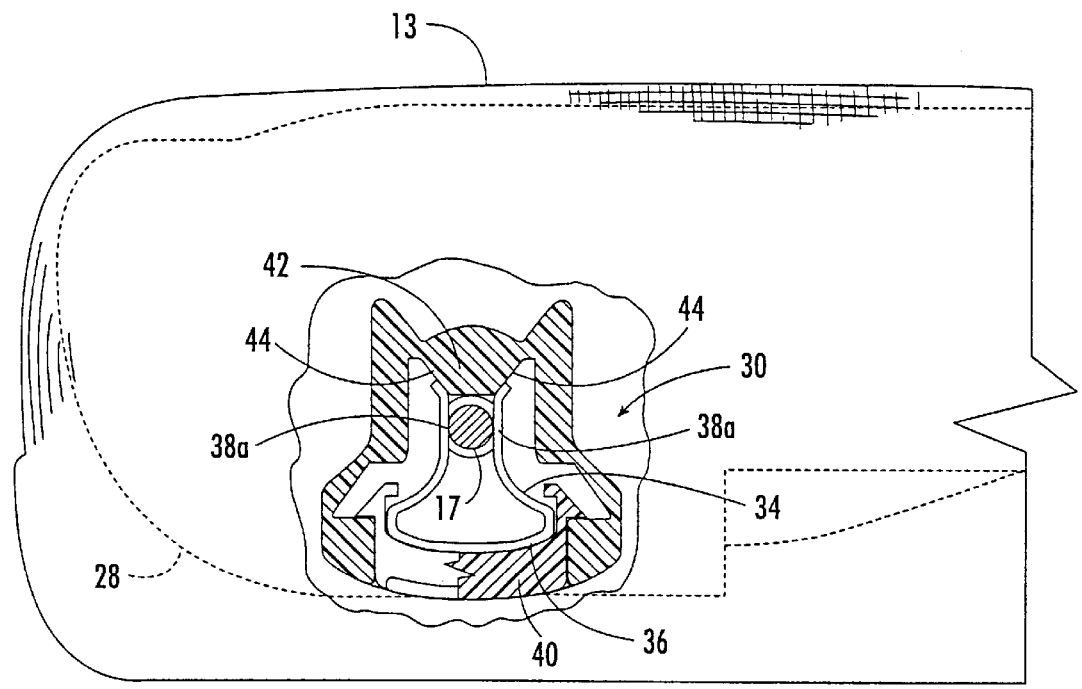
FIG. 3B is a partial cutaway view of the apparatus of FIG. 3A taken along lines 3B—3B, and illustrating the retaining member in a relaxed configuration.
Figure 3C:
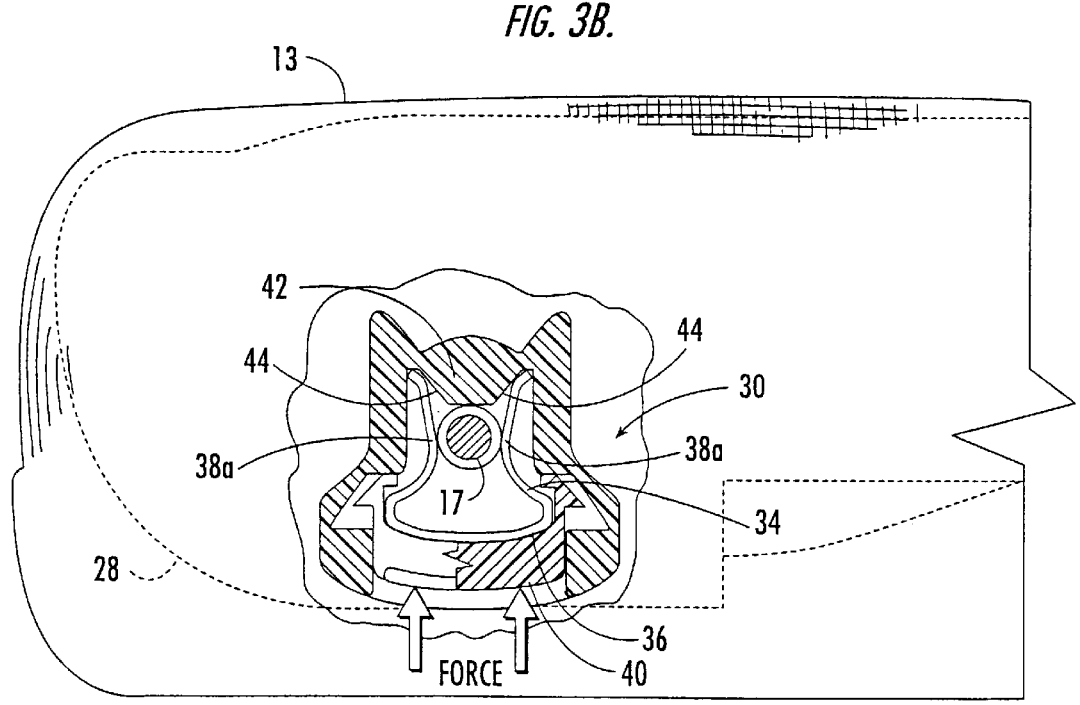
FIG. 3C is the partial cutaway view of FIG. 3B illustrating a force being applied to the retaining member such that the free ends of the retaining member arms are moved along the diverging surfaces of the diversion member to separate the retaining member arms.

Referring now to FIGS. 3A–3C, the quick connect/disconnect apparatus 30 of FIGS. 2A–2B is attached to a frame 28 of an armrest 13 and the armrest is in an installed configuration mounted on a mounting pin 14. The mounting pin free end 15 extends outwardly from a seat back 12. As would be understood by those of skill in the art. The free end 15 of the mounting pin 14 extends through the housing bore 35 as illustrated, and the intermediate portions 38a of each arm 38 are in engagement with a circumferentially-extending groove 17 in the mounting pin 14.

In the illustrated embodiment, the housing 32 is attached to an armrest frame 28 via a boss 37 which extends from a side of the housing 32. The illustrated boss 37 is configured to receive a portion of the mounting pin free end 15 therethrough. The housing 32 of a quick connect/disconnect apparatus 30 may be secured to an armrest frame in various ways and is not limited to the illustrated embodiment.

An actuator 40 is slidably disposed within the housing cavity 33. When a force (indicated by F in FIG. 3C) is applied to the actuator, the actuator slides within the cavity 33, engages the retaining member base portion 36, and causes the retaining member arms 38 to move in opposite directions so that an armrest can be secured on or removed from the mounting pin 14. In the illustrated embodiment, the actuator 40 does not engage the retaining member base portion 36 when the retaining member 34 is in a relaxed configuration. The actuator 40 is not utilized to hold or position the retaining member 34 in any configuration other than when it is desirable to disengage the retaining member arms 38 from the mounting pin 14.

As illustrated in FIGS. 3B and 3C, a diversion member 42 is disposed within (or is a part of) the housing 32, and includes a pair of spaced-apart, diverging surfaces 44. When the actuator 40 applies a force to the retaining member base portion 36, the free end 38b of each retaining member arm 38 slides along a respective one of the diverging surfaces 44 of the diversion member 40. This movement urges the retaining member arm intermediate portions 38a away from each other so that they disengage from the circumferentially-extending groove 17 on the mounting pin 14 and such that the mounting pin 14 can be removed from the housing 32 (i.e., such that the armrest 13 can be removed from the seat back 12). The free ends 38b of the retaining member 34 need not touch or engage the respective diverging surfaces 44 when the retaining member is in a relaxed configuration.

FIG. 3B illustrates the retaining member 34 in a relaxed configuration such that the retaining arm intermediate portions 38a engage the groove 17 on the mounting pin 14. In FIG. 3C, a force has been applied to the retaining member via the actuator 40 and the free ends 38b of the retaining member arms 38 have moved along respective diverging surfaces 44 of the diversion member 42 such that the retaining member arm intermediate portions 38a have disengaged from the groove 17 on the mounting pin 14.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for removably securing an armrest to a mounting pin, comprising:
a housing attached to the armrest, wherein the housing is configured to receive a free end of the mounting pin;
a retaining member disposed within the housing, wherein the retaining member comprises:
a base portion; and
a pair of spaced-apart, resilient arms extending from the base portion, wherein each arm includes an intermediate portion and a free end, and wherein the intermediate portion of each arm is configured to engage a respective portion of a circumferentially-extending groove adjacent the free end of the mounting pin when the retaining member is in a relaxed configuration;

a pair of spaced-apart, diverging surfaces disposed within the housing; and an actuator slidably disposed within the housing and movable so as to engage the retaining member base portion and cause the free end of each retaining member arm to slide along a respective diverging surface to urge the retaining member arm intermediate portions away from each other so as to become disengaged from the circumferentially-extending groove such that the mounting pin can be removed from the housing.

2. The apparatus according to claim 1, wherein the intermediate portion of each retaining member arm has an arcuate configuration.

3. The apparatus according to claim 1, wherein the free ends of the retaining member arms have a diverging configuration.

4. The apparatus according to claim 1, wherein the retaining member comprises steel wire.

5. The apparatus according to claim 1, wherein the intermediate portion of each arm is configured to engage a respective diametrically opposite portion of the circumferentially-extending groove.

6. An armrest for pivotal attachment to a seat assembly, comprising:

a frame;

a housing attached to the frame, wherein the housing is configured to receive a free end of a mounting pin extending outwardly from a seat assembly;

a retaining member disposed within the housing, wherein the retaining member comprises:
a base portion; and
a pair of spaced-apart, resilient arms extending from the base portion, wherein each arm includes an intermediate portion and a free end, and wherein the intermediate portion of each arm is configured to engage a respective portion of a circumferentially-extending groove adjacent the free end of the mounting pin when the retaining member is in a relaxed configuration;

a pair of spaced-apart, diverging surfaces disposed within the housing; and an actuator slidably disposed within the housing and movable so as to engage the retaining member base portion and cause the free end of each retaining member arm to slide along a respective diverging surface to urge the retaining member arm intermediate portions away from each other so as to become disengaged from the circumferentially-extending groove and such that the mounting pin can be removed from the housing.

7. The armrest according to claim 6, wherein the intermediate portion of each retaining member arm has an arcuate configuration.

8. The armrest according to claim 6, wherein the free ends of the retaining member arms have a diverging configuration.

9. The armrest according to claim 6, wherein the retaining member comprises steel wire.

10. The armrest according to claim 6, wherein the intermediate portion of each arm is configured to engage a respective diametrically opposite portion of the circumferentially-extending groove.

11. A vehicle seat assembly, comprising:

a seat;

a mounting pin extending outwardly from a side portion of the seat, wherein the mounting pin has a free end and a circumferentially-extending groove on a surface thereof adjacent the free end; and an armrest removably secured to the mounting pin, comprising:
a housing attached to the component, wherein the housing is configured to receive the free end of the mounting pin;
a retaining member disposed within the housing, wherein the retaining member comprises:
a base portion; and
a pair of spaced-apart, resilient arms extending from the base portion, wherein each arm includes an intermediate portion and a free end, and wherein the intermediate portion of each arm is configured to engage a respective portion of the circumferentially-extending groove on the mounting pin when the retaining member is in a relaxed configuration;
a pair of spaced-apart, diverging surfaces disposed within the housing; and
an actuator slidably disposed within the housing and movable so as to engage the retaining member base portion and cause the free end of each retaining member arm to slide along a respective diverging surface to urge the retaining member arm intermediate portions away from each other so as to become disengaged from the circumferentially-extending groove such that the armrest can be removed from the mounting pin.

12. The vehicle seat assembly according to claim 11, wherein the intermediate portion of each retaining member arm has an arcuate configuration.

13. The vehicle seat assembly according to claim 11, wherein the free ends of the retaining member arms have a diverging configuration.

14. The vehicle seat assembly according to claim 11, wherein the retaining member comprises steel wire.

15. The vehicle seat assembly according to claim 11, wherein the intermediate portion of each arm is configured to engage a respective diametrically opposite portion of the circumferentially-extending groove.

* * * * *